(12) United States Patent
Tani

(10) Patent No.: US 8,306,317 B2
(45) Date of Patent: Nov. 6, 2012

(54) IMAGE PROCESSING APPARATUS, METHOD AND COMPUTER PROGRAM PRODUCT

(75) Inventor: Shinsuke Tani, Hachioji (JP)

(73) Assignee: Olympus Corporation, Tokyo (JP)

( * ) Notice: Subject to any disclaimer, the term of this patent is extended or adjusted under 35 U.S.C. 154(b) by 968 days.

(21) Appl. No.: 12/353,631

(22) Filed: Jan. 14, 2009

(65) Prior Publication Data

US 2009/0180684 A1 Jul. 16, 2009

(30) Foreign Application Priority Data

Jan. 15, 2008 (JP) ................................. 2008-005885

(51) Int. Cl.
*G06K 9/00* (2006.01)

(52) U.S. Cl. ....................................................... 382/162

(58) Field of Classification Search .................. 382/100, 382/128, 165, 170, 173, 190–191, 254, 260, 382/274–275, 286, 312; 356/303, 369–370, 356/445; 348/61, 77, 241, 362–368
See application file for complete search history.

(56) References Cited

U.S. PATENT DOCUMENTS

| | | | | |
|---|---|---|---|---|
| 5,717,605 | A * | 2/1998 | Komiya et al. | 356/406 |
| 5,915,036 | A * | 6/1999 | Grunkin et al. | 382/132 |
| 6,208,749 | B1 * | 3/2001 | Gutkowicz-Krusin et al. | 382/128 |
| 6,995,847 | B2 * | 2/2006 | Fashant et al. | 356/445 |
| 7,227,122 | B2 | 6/2007 | Arai | |
| 7,436,997 | B2 * | 10/2008 | Ishigami et al. | 382/167 |
| 7,813,586 | B2 * | 10/2010 | Gutkowicz-Krusin et al. | 382/275 |
| 8,115,857 | B2 * | 2/2012 | Kuniba | 348/362 |

FOREIGN PATENT DOCUMENTS

| | | |
|---|---|---|
| JP | H7-120324 | 5/1995 |
| JP | 2002-290824 | 10/2002 |
| JP | 2003-134527 | 5/2003 |
| JP | 2005-167444 | 6/2005 |
| JP | 2005-181038 | 7/2005 |
| JP | 2007-274637 | 10/2007 |
| WO | WO 2005/033678 A1 | 4/2005 |

OTHER PUBLICATIONS

Fuji et al. "Development of support systems for pathology using spectral transmittance-the quantification method of stain conditions", Proceeding of SPIE, vol. 4684, 2002, pp. 1516-1523; and.
Abe et al. "Color Correction of Pathological Images Based on Dye Amount Quantification", Optical Review, vol. 12, No. 4, 2005, pp. 293-300.
Japanese Official Action dated May 29, 2012 from related application JP 2008-005885 together with an English language translation.

* cited by examiner

*Primary Examiner* — Jose Couso
(74) *Attorney, Agent, or Firm* — Scully, Scott, Murphy & Presser, P.C.

(57) ABSTRACT

An image processing apparatus includes an image acquiring unit that acquires image data about a plurality of subject images of a subject picked up under a plurality of exposure conditions different from each other; a pixel value acquiring unit that acquires, as a pixel value of a pixel position to which a spectral characteristic is to be estimated, a pixel value of the image data about any one of the subject images; an estimation operator calculator that calculates an estimation operator corresponding to the exposure condition of the subject image corresponding to the image data with the pixel value acquired by the pixel value acquiring unit; and a spectral characteristic estimating unit that estimates the spectral characteristic of the subject corresponding to the pixel position to which the spectral characteristic is to be estimated using the estimation operator calculated by the estimation operator calculator.

8 Claims, 10 Drawing Sheets

ARRANGEMENT OF COLOR FILTER

ARRANGEMENT OF PIXELS OF RGB BANDS

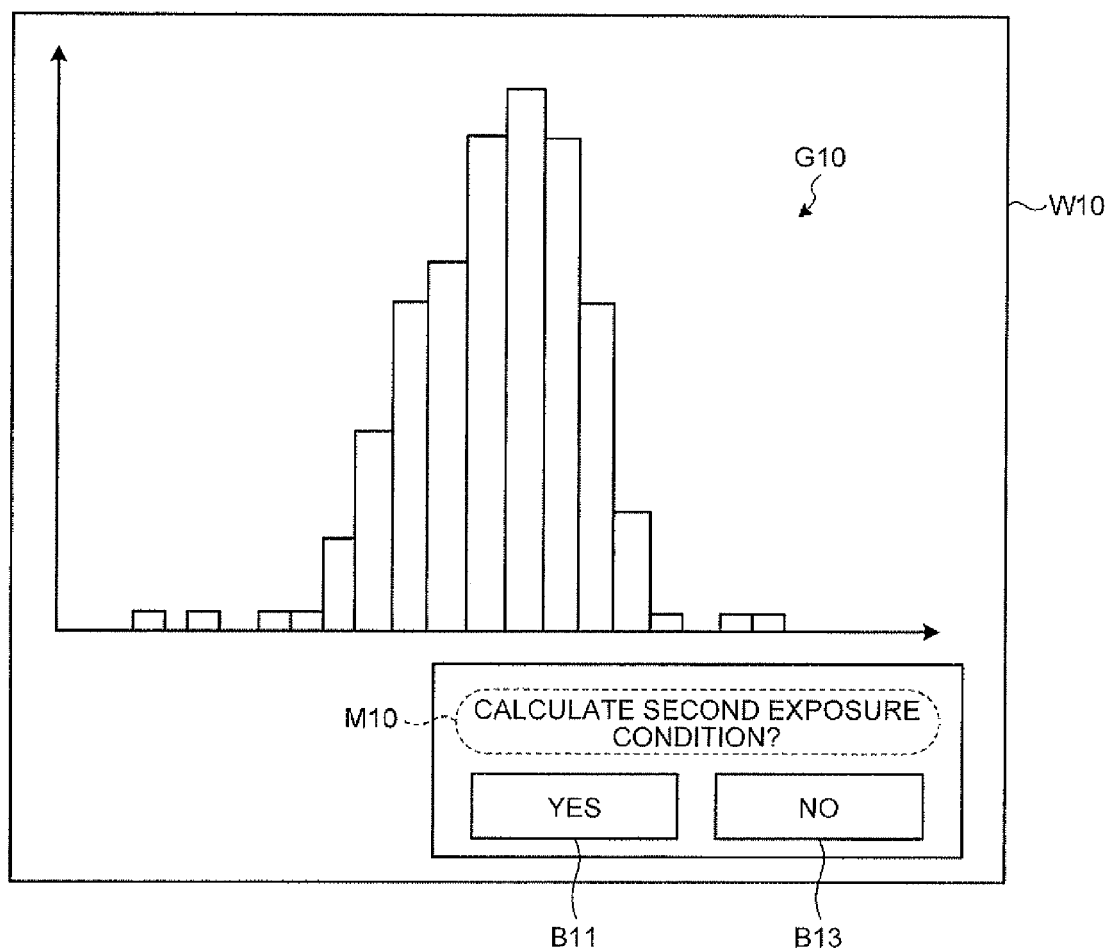

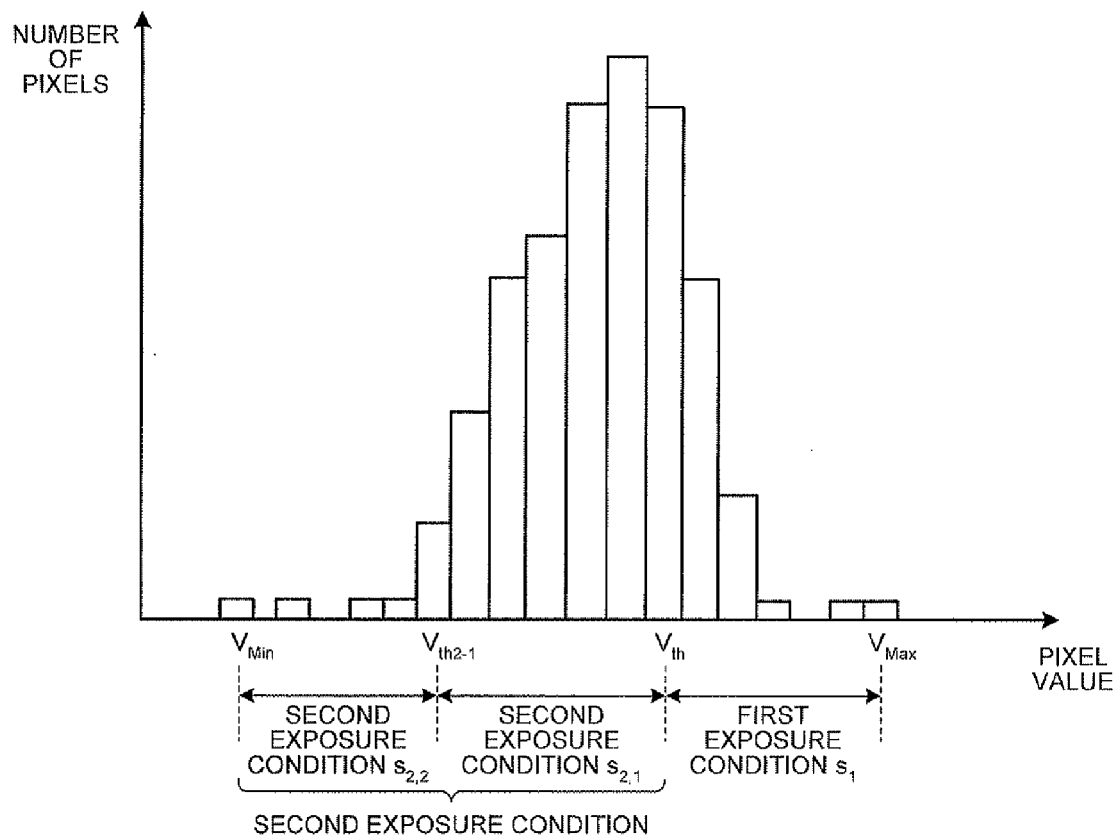

IMAGE PROCESSING APPARATUS, METHOD AND COMPUTER PROGRAM PRODUCT

CROSS-REFERENCE TO RELATED APPLICATIONS

This application is based upon and claims the benefit of priority from Japanese Patent Application No. 2008-005885, filed Jan. 15, 2008, the entire contents of which are incorporated herein by reference.

BACKGROUND OF THE INVENTION

1. Field of the Invention

The present invention relates to an image processing apparatus that processes an image of a subject and estimates a spectral characteristic of the subject, and to a computer program product.

2. Description of the Related Art

A spectral transmittance is one type of physical quantity representing physical characteristics unique to a subject. The spectrum transmittance is a physical amount that represents a ratio of transmitted light to incident light at each wavelength. Different from color information depending on variations in illumination light, such as R, G, and B values, the spectral transmittance is information unique to an object and it does not vary due to external influence. For this reason, the spectral transmittance is used in various fields as information for reproducing the color of the subject. For example, in the field of pathological diagnosis using a body tissue specimen, particularly, a pathological specimen, technology for estimating a spectral transmittance is used for analyzing an image of the specimen.

Pathological diagnosis is widely performed in which a block specimen extirpated from an internal organ or a pathological specimen obtained by needle biopsy is sliced to few microns, and the sliced specimen is then enlarged with a microscope for observation to have various findings. Particularly, observation in which transmitted light is observed employing an optical microscope is one of the most common observation methods, because it requires equipments that are relatively low-cost and easily handled and it is a time-honored method. In the observation, because the sliced specimen is almost clear and colorless and it does not absorb or scatter light, the sliced specimen is usually stained with pigment before observation.

Various staining methods up to 100 types or more have been proposed. Particularly for pathological specimens, haematoxylin-eosin staining (hereinafter, "H&E staining") employing haematoxylin for violet and eosin for red are normally used as pigment.

Haematoxylin is a natural substance sampled from plants, and it is not stainable. However, haematin, which is oxidized haematoxylin, is a basophilic pigment that is bound to a negatively-charged material. Because deoxyribo nucleic acid (DNA) contained in a cell nucleus is negatively charged because of the phosphate group contained as a constituent, DNA is bound to haematin and stained to violet. Although, as described above, not haematoxylin but haematin, which is oxidized haematoxylin, is stainable, haematoxylin is usually used as the name of the pigment. Therefore, haematoxylin is used as the pigment below. On the other hand, eosin is an acidophil pigment that is bound to a positively-charged material. The pH environment influences whether amino acid or protein is negatively or positively charged, and they tend to be positively charged in an acidic state. For this reason, an eosin solution added with acetic acid is used in some cases. Proteins contained in cytoplasm are bound to eosin and stained from red to light red.

In a specimen stained through the HaG staining (stained specimen), cell nuclei and bone tissues are stained to violet, while cytoplasm, connective tissues, and erythrocytes are stained to red, so that they are easily recognizable. As a result, an observer can see the sizes of and positional relationship between elements constituting tissues including cell nuclei, thereby determining the state of the stained specimen morphologically.

The stained specimen can be visually observed by an observer. Alternatively, the stained specimen can be observed in a manner that a multiband image of the stained specimen is picked up and the multiband image is displayed on a display screen of an external device. When the image is displayed on the display screen, processing for estimating a spectral transmittance of each point on the specimen from the multiband image, processing for estimating the amount of pigment with which the specimen is stained based on the estimated spectrum transmittance, and processing for correcting the color of the image based on the estimated amount of pigment. Accordingly, the variance in characteristics of cameras and stain condition is corrected, so that an RGB image of the specimen to be displayed is synthesized. FIG. 13 is a graph of an example of the synthesized RGB image. If the amount of pigment is appropriately estimated, an image of a specimen stained to thicker colors and light colors can be corrected to an image in a color equivalent to that of an appropriately-stained specimen. For this reason, estimating a spectral transmittance of a stained specimen with high accuracy leads to highly accurately estimating the fixed amount of pigment of the stained specimen and correcting variance in staining.

Methods of estimating a spectral transmittance at each point on a specimen from multiband images of the specimen include an estimating method employing analysis of primary component (for example, see "Development of support systems for pathology using spectral transmittance—The quantification method of stain conditions", Proceeding of SPIE, Vol. 4684, 2002, pp. 1516-1523), or an estimating method employing Wiener estimation (for example, see "Color Correction of Pathological Images Based on Dye Amount Quantification", OPTICAL REVIEW, Vol. 12, No. 4, 2005, pp. 293-300) The Wiener estimation is widely known as a linear filtering method of estimating an original signal from an observed signal with noises in which errors are minimized in consideration of statistical characteristic of a subject to be observed and characteristics of observed noise. Because some noise is contained in a signal from a camera, the Wiener estimation is significantly useful as a method of estimating an original signal.

The method of estimating a spectral transmittance at each point on a specimen from multiband images of the specimen, employing the Wiener estimation, is explained below.

First, a multiband image of the specimen is picked up by, for example, the technology disclosed in Japanese Patent Application Laid-open No. H7-120324 employing a frame sequential method in which 16 bandpass filters are rotated with a filter wheel to switch the bandpass filters. Accordingly, the multiband image with pixel values of 16 bands at each point on the specimen is obtained. Pigment spreads three-dimensionally in the stained specimen to be observed originally. In a normal observation system in which transmitted light observation is performed, however, the specimen cannot be taken as a three dimensional image, and it is observed as a two-dimensional image obtained by projecting illumination light having transmitted through the specimen on an imaging device of a camera. Therefore, each point denotes each point on the specimen that corresponds to each pixel of the image projected on the imaging device.

Regarding a position x on the multiband image, the following Equation (1) based on a response system of the camera is satisfied between a pixel value g(x, b) and a spectral transmittance t(x, λ) at a corresponding point on the specimen.

$$g(x,b)=\int f(b,\lambda)s(\lambda)e(\lambda)t(x,\lambda)d\lambda+n(b) \quad (1)$$

where λ is a wavelength, f(b, λ) is a spectral transmittance of a b-th filter, s(λ) is a spectral sensitivity, e(λ) is a spectral radiation characteristic, n(b) is an observed noise of the band b. The band b is a serial number identifying the band and is an integer satisfying $1 \leq b \leq 16$.

In actual calculation, the following Equation (2) obtained by a discrete method in a wavelength direction is used.

$$G(x)=FSET(x)+N \quad (2)$$

When the number of sample points in the wavelength direction is D and the number of bands is B (B=16 in this case), G(x) is a matrix of B rows and 1 column corresponding to the pixel value g(x, b) at the position x. Similarly, T(x) is a matrix of D rows and one column corresponding to t(x, λ), F is a matrix of B rows and D columns corresponding to f(b, λ). On the other hand, S is a diagonal matrix of D rows and D columns, and a diagonal element corresponds to s(λ) Similarly, E is a diagonal matrix of D rows and D columns and a diagonal element corresponds to e(λ). N is a matrix of B rows and one column corresponding to n(b). In Equation (2), because formulas about a plurality of bands are aggregated using the matrices, the variable b representing the band is not explicitly described. An integral of the wavelength λ is replaced by a product of the matrices.

To simplify the expression, a matrix H defined by the following Equation (3) is introduced. H is also referred to as a system matrix.

$$H=FSE \quad (3)$$

Subsequently, a spectral transmittance at each point on the specimen is estimated from the multiband image, using the Wiener estimation. An estimated value $\hat{T}(x)$ can be calculated from the following Equation (4)

$$\hat{T}(x)=WG(x) \quad (4)$$

W in Equation (4) is represented by the following Equation (5), and is referred to as "Wiener estimated matrix" or "estimation operator used for Wiener estimation". In the following explanation, W is simply referred to as "estimation operator".

$$W=R_{SS}H^t(HR_{SS}H^t+R_{NN})^{-1} \quad (5)$$

where Ht represents a transposed matrix of H, (HRSSHt+RNN)−1 represents an inverse matrix of HRSSHt+RNN, and $R_{SS}$ is an matrix of the row D and the column D that represents an autocorrelation matrix of the spectral transmittance of the specimen. $R_{NN}$ is a matrix of B rows and B columns that represents an autocorrelation matrix of noise of the camera to be used to pick up an image. The estimation operator consists of the system matrix H, a term $R_{SS}$ representing a statistical characteristic, and a term $R_{NN}$ representing a characteristic of the observed noise. Highly accurately representing each characteristic leads to improvement of accuracy in estimating the spectral transmittance.

SUMMARY OF THE INVENTION

An image processing apparatus according to one aspect of the present invention estimates a spectral transmittance of a subject from a pixel value of a subject image of the subject using an estimation operator. The image processing apparatus includes an image acquiring unit that acquires image data about a plurality of subject images of the subject picked up under a plurality of exposure conditions different from each other; a pixel value acquiring unit that acquires, as a pixel value of a pixel position to which a spectral characteristic is to be estimated, a pixel value of the image data about any one of the subject images; an estimation operator calculator that calculates the estimation operator corresponding to the exposure condition of the subject image corresponding to the image data with the pixel value acquired by the pixel value acquiring unit; and a spectral characteristic estimating unit that estimates the spectral characteristic of the subject corresponding to the pixel position to which the spectral characteristic is to be estimated using the estimation operator calculated by the estimation operator calculator.

A computer program product according to another aspect of the present invention has a computer readable medium including programmed instructions for estimating a spectral characteristic of a subject using an estimation operator from a pixel value of a subject image of the subject. The instructions, when executed by a computer, cause the computer to perform acquiring image data about a plurality of subject images of the subject picked up under a plurality of exposure conditions different from each other; acquiring, as a pixel value of a pixel position to which a spectral characteristic is to be estimated, a pixel value of the image data about any one of the subject images; calculating the estimation operator corresponding to the exposure condition of the subject image corresponding to the image data with the pixel value acquired by the pixel value acquiring unit; and estimating the spectral characteristic of the subject corresponding to the pixel position to which the spectral characteristic is to be estimated using the estimation operator calculated by the estimation operator calculator.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a schematic diagram of a notification screen notifying a determination request;

FIG. 9 is a diagram for explaining calculation of a second exposure condition;

FIG. 10 is a table of a data structure of a pixel-value/exposure condition table;

DETAILED DESCRIPTION OF THE PREFERRED EMBODIMENTS

Figure 1:
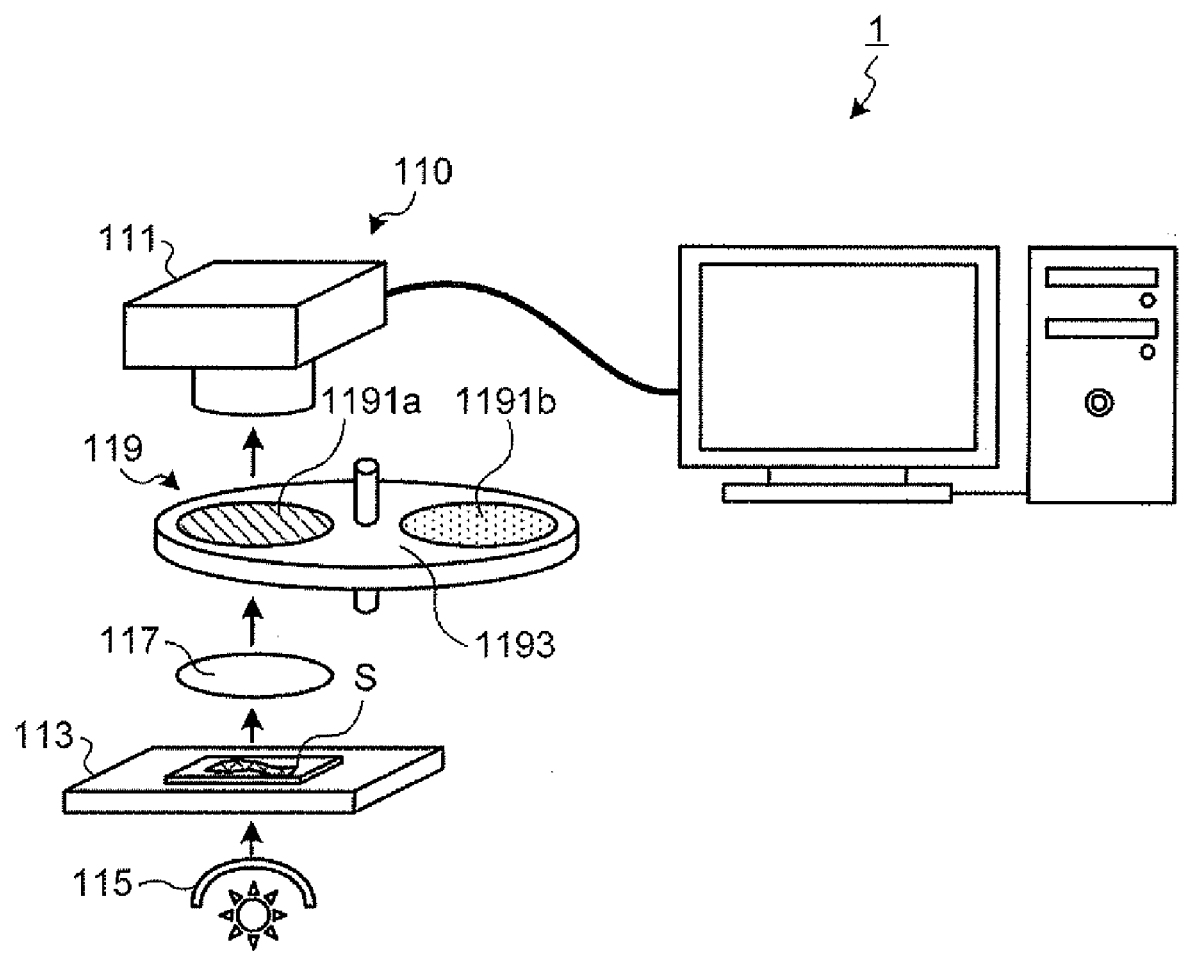
FIG. 1 is a schematic diagram of a configuration of an image processing apparatus according to an embodiment of the present invention.

Exemplary embodiments according to the present invention are explained in detail below with reference to the accompanying drawings. In the embodiments, a case is explained where a body tissue specimen stained through the H&E staining is a subject, and a spectral characteristic of a spectral transmittance is estimated as a spectral characteristic from multiband images of the subject. In the drawings, the same constituents are denoted by the same reference numerals.

FIG. 1 is a schematic diagram of a configuration of an image processing apparatus according to an embodiment of the present invention. As shown in FIG. 1, an image processing apparatus 1 is a computer such as a personal computer, and it includes an image acquiring unit 110 that acquires a multiband image of a specimen.

The image acquiring unit 110 performs an image acquiring operation to pick up an image of the specimen, which is stained through the H&F staining, whose spectral characteristic is to be estimated (hereinafter, "subject specimen"), thereby acquiring a multiband image of six bands. The image acquiring unit 110 includes an RGB camera 111, a specimen holder 113, an illuminating unit 115, an optical system 117, and a filtering unit 119. The RGB camera 111 includes an imaging device such as a charged coupled device (CCD). A subject specimen S is put on the specimen holder 113. The illuminating unit 115 emits a light such that a subject specimen S on the specimen holder 113 is illuminated with light and the light is transmitted through the specimen S. The optical system 117 focuses the light from the subject specimen S. The filtering unit 119 limits the bandwidth of the focused light in a predetermined range.

Figure 2:
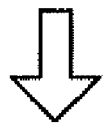
FIG. 2 is a diagram of an example of arrangement of a color filter and examples of pixel arrangement of R, G, and B bands.

The RGB camera 111 is widely used as, for example, digital cameras, in which, for example, RGB color filters are arranged in mosaic on a black and white imaging device. The RGB camera 111 is arranged such that the center of an image to be picked up is on an optical axis of the illumination light. FIG. 2 is a schematic diagram of an example of arrangement of a color filter and examples of pixel arrangement of R, G, and B bands. Although each pixel of the image only corresponds to any one of R, G, and B components, absent R, G, and B components are interpolated using pixel values in vicinity. This method is disclosed in, for example, Japanese Patent No. 3510037. If a 3CCD camera is used, R, G, and B components of each pixel can be originally acquired. Any of the above methods can be used. In the description below, it is provided that R, G, and B components of each pixel of the image picked up by the RGB camera 111 have been acquired.

Figure 3:
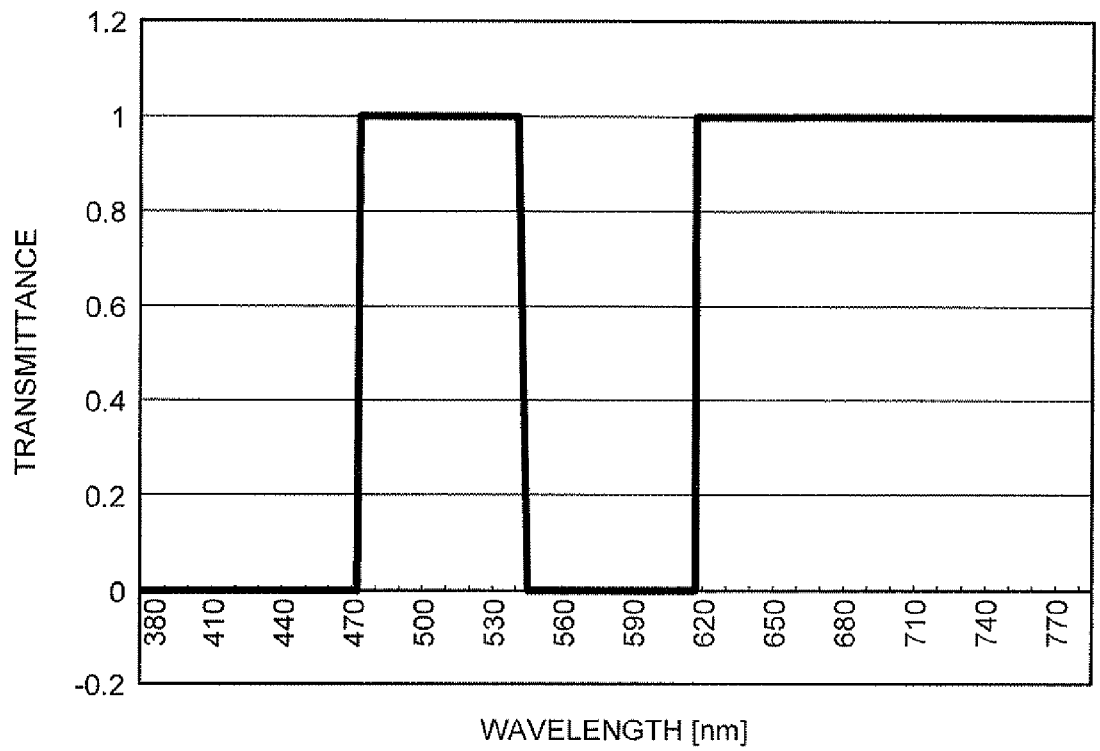
FIG. 3 is a graph of spectral transmittance characteristic of an optical filter.
Figure 4:
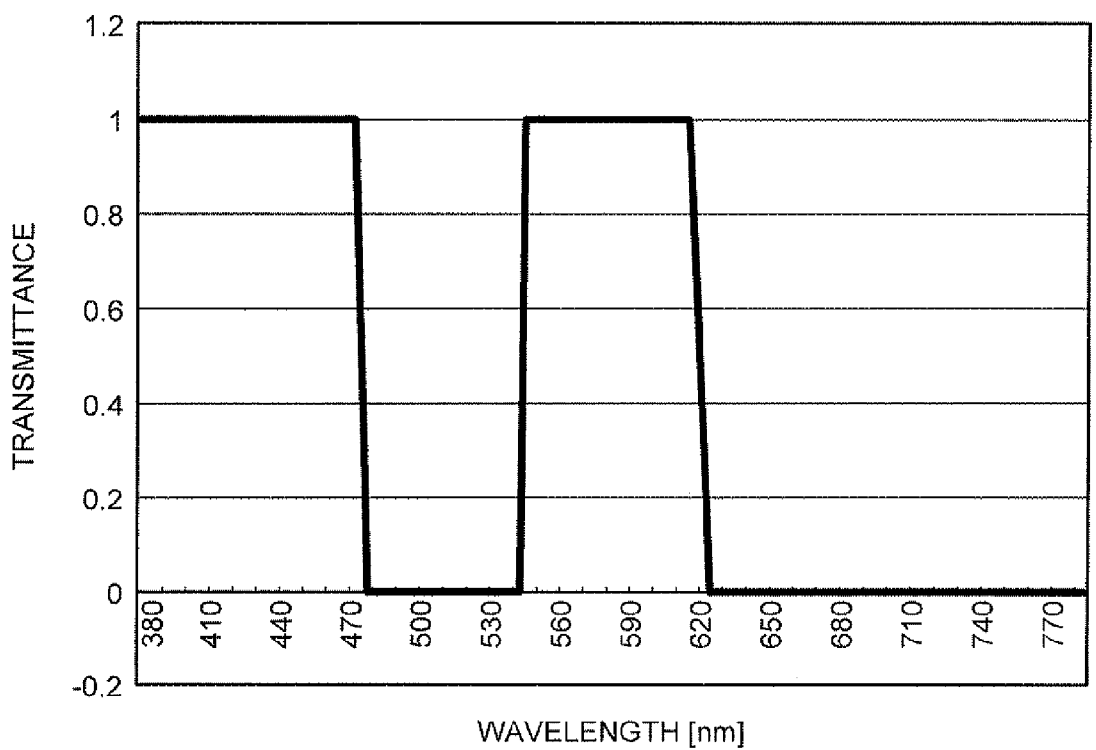
FIG. 4 is a graph of spectral transmittance characteristic of another optical filter.

The filtering unit 119 includes two optical filters 1191a and 1191b having spectral transmittance characteristics different from each other. A rotatable optical filter switching unit 1193 holds the optical filters 1191a and 1191b. FIG. 3 is a graph of the spectral transmittance characteristic of the optical filter 1191a, and FIG. 4 is a graph of the spectral transmittance characteristic of the optical filter 1191b. For example, first, first imaging is performed using the optical filter 1191a. Thereafter, the optical filter to be used is switched to the optical filter 1191b depending on rotation of the optical filter switching unit 1193, and second imaging is performed with the optical filter 1191b. Through each of the first and second imaging, a 3-band image is obtained, so that multiband images of six bands are obtained in total. The number of optical filters is not limited to two, and three or more optical filters can be used. The multiband image is stored in a storage unit 150 of the image processing apparatus 1 as a subject specimen image.

Figure 5:
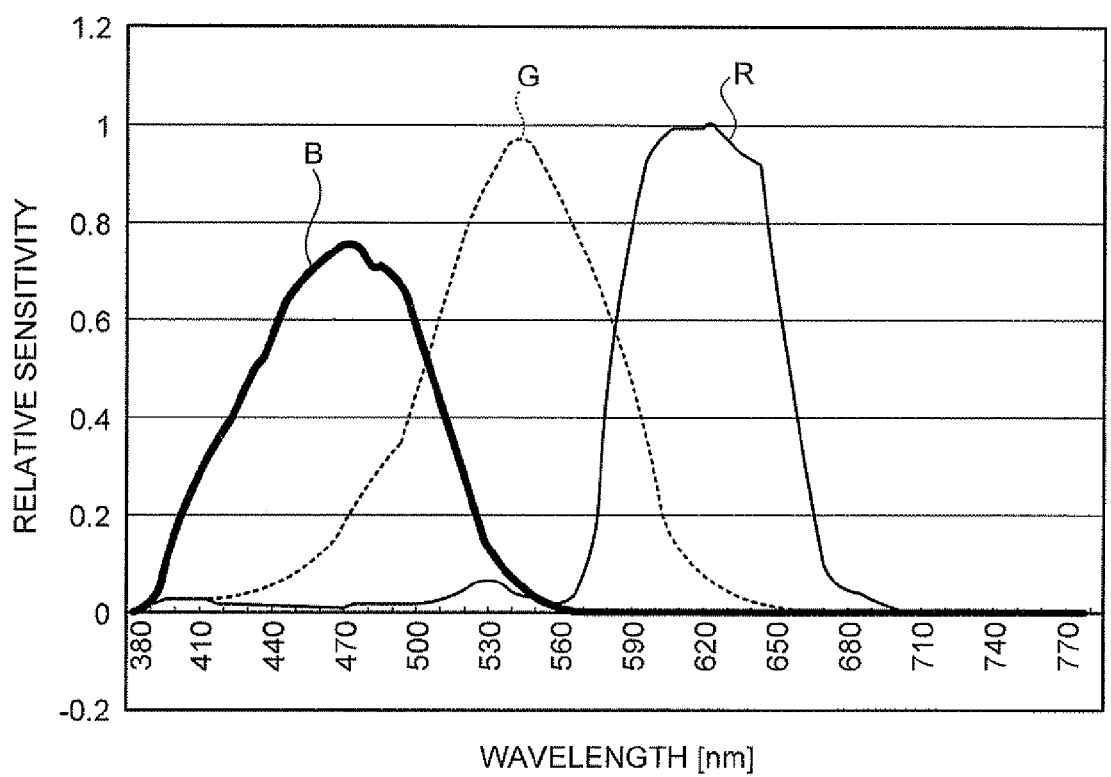
FIG. 5 is a graph of examples of spectral transmittances of the R, G, and B bands.

In the image acquiring unit 110, the illumination light emitted by the illuminating unit 115 passes thorough the subject specimen S on the specimen holder 113. The illumination light having passed through the subject specimen S passes through the optical system 117 and the optical filters 1191a and 1191b, and then focused on an imaging device of the RGB camera 111. It suffices that the filtering unit 119 including the optical filters 1191a and 1191b is arranged in any position on the optical path from the illuminating unit 115 to the RGB camera 111. FIG. 5 shows examples of spectral transmittances of the R, G, B bands, which are obtained when the illumination light from the illuminating unit 115 is picked up by the RGB camera 111 via the optical system 117. In this embodiment, the image acquiring unit 110 is used to acquire a plurality of subject specimen images of the target specimen S, which are picked up at different exposure conditions.

Figure 6:
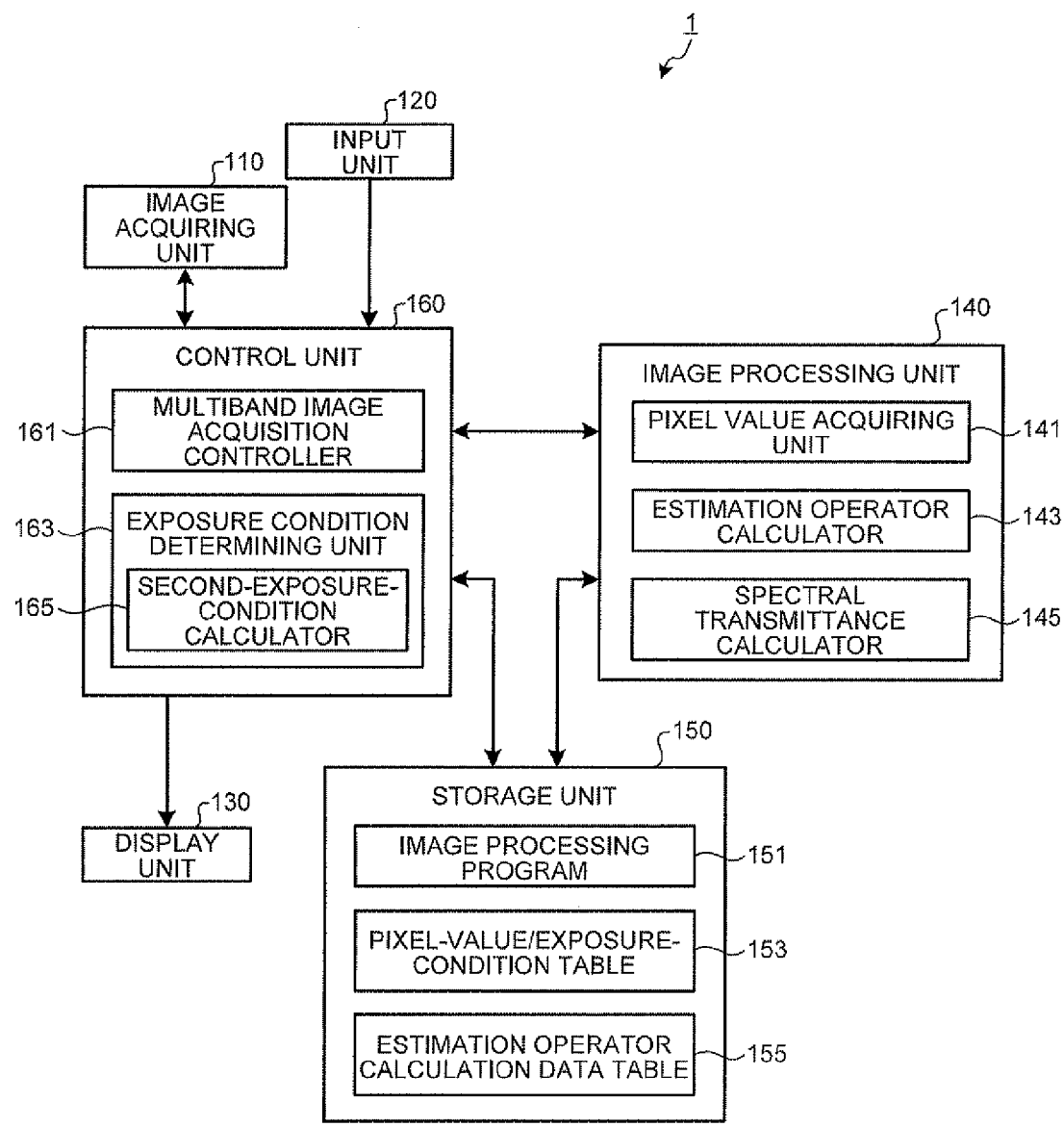
FIG. 6 is a block diagram of a functional configuration of the image processing apparatus.

FIG. 6 is a block diagram of a functional configuration of the image processing apparatus 1. In the embodiment, the image processing apparatus 1 includes the image acquiring unit 110, an input unit 120, a display unit 130, an image processing unit 140, the storage unit 150, and a control unit 160 that controls each unit of the image processing apparatus 1.

The control unit 160 is hardware such as a CPU. The control unit 160 controls operations of the image processing apparatus 1 by transferring an instruction or data to each unit of the image processing apparatus 1 based on an operation signal input from the input unit 120 and image data input from the image acquiring unit 110, and programs or data stored in the storage unit 150. The control unit 160 includes a multiband image acquisition controller 161 and an exposure condition determining unit 163. The multiband image acquisition controller 161 is a function unit that controls an image acquiring operation of the image acquiring unit 110 for acquiring an image, and it changes stepwise an exposure condition on each image acquiring operation. The exposure condition determining unit 163 determines a shutter speed (exposure time), which is an example of the exposure condition, and outputs the shutter speed to the multiband image acquisition controller 161. The exposure condition determining unit 163 determines an exposure condition on the first image acquiring operation as a first exposure condition $s_1$ that is previously determined. The exposure condition determining unit 163 includes a second exposure condition calculator 165, and determines a second exposure condition $s_2$ calculated by the second exposure condition calculator 165 as an exposure condition on the second or subsequent image acquiring operation. The second exposure condition calculator 165 calculates the second exposure condition $s_2$ based on pixel values of the pixels constituting the subject specimen image acquired under the first exposure condition $s_1$. The multiband image acquisition controller 161 controls the shutter speed of the RGB camera 111 in accordance with the exposure condition determined by the exposure condition determining unit 163, so that a target specimen image picked up under the first exposure condition $s_1$ or the second exposure condition $s_2$ is acquired.

The input unit 120 includes various types of input devices such as a key board, a mouse, a touch panel, and various types of switches, and it outputs an operation signal corresponding to an operation input to the control unit 160. The display unit 130 is a display device such as a liquid crystal display (LCD) or a light emitting diode (LED) display, and it displays various types of screens based on display signals input from the control unit 160.

The image processing unit 140 is hardware such as a CPU. The image processing unit 140 includes a pixel value acquiring unit 141, an estimation operator calculator 143, and a spectral transmittance calculator 145. The pixel value acquiring unit 141 acquires, as an optimum pixel value, a pixel value at a pixel position (estimation subject pixel) to which a spectral characteristic is to be estimated from the subject specimen images acquired under the first exposure condition $s_1$ (hereinafter, appropriately "first exposure condition image") and the subject specimen image acquired under the second exposure condition $s_2$ (hereinafter, appropriately "second exposure condition image"). The estimation operator calculator 143 calculates an estimation operator corresponding to an optimum exposure condition, which is the exposure condition under which the subject specimen image with the optimum pixel value is acquired. The spectral transmittance calculator 145 calculates spectral transmittance data about a spectral transmittance at a point in the subject specimen image that is a position in the subject corresponding to the estimation subject pixel, using the estimation operator calculated for the estimation subject pixel by the estimation operator calculator 143.

The storage unit 150 includes various types of IC memories including a read only memory (ROM) and a random access memory (RAM) such as a flash memory in which data can be updated, a built-in hard disk or a hard disk connected via a data communication terminal, an information storage medium such as a compact disk read only memory (CD-ROM), and a reading device that reads information from the memories. The storage unit 150 stores therein a program for operations of the image processing apparatus 1, a program for realizing various functions of the image processing apparatus 1, and data for executing the programs. For example, image data about subject specimen images are stored in the storage unit 150. In addition, the storage unit 150 stores therein an image processing program 151, a pixel-value/exposure-condition table 153, and an estimation operator calculation data table 155. The image processing program 151 is executed to acquire a plurality of subject specimen images under different exposure conditions, and estimate a spectral characteristic of the subject specimen, using the estimation operator calculated based on the pixel value of each subject specimen image. The pixel-value/exposure-condition table 153 is data table in which an optimum exposure condition of a pixel value of the first exposure condition image, which is acquired under the first exposure condition $s_1$, is set in association with the pixel value. The pixel-value/exposure-condition table 153 is created by the exposure condition determining unit 163, and stored in the storage unit 150. The estimation operator calculation data table 155 is data table in which an optimum exposure condition and a pixel value (optimum pixel value) at each pixel position, which are used to calculated the estimation operator, are set for each a pixel position. The estimation operator calculation data table 155 is created by the pixel value acquiring unit 141, and stored in the storage unit 150.

Figure 7:
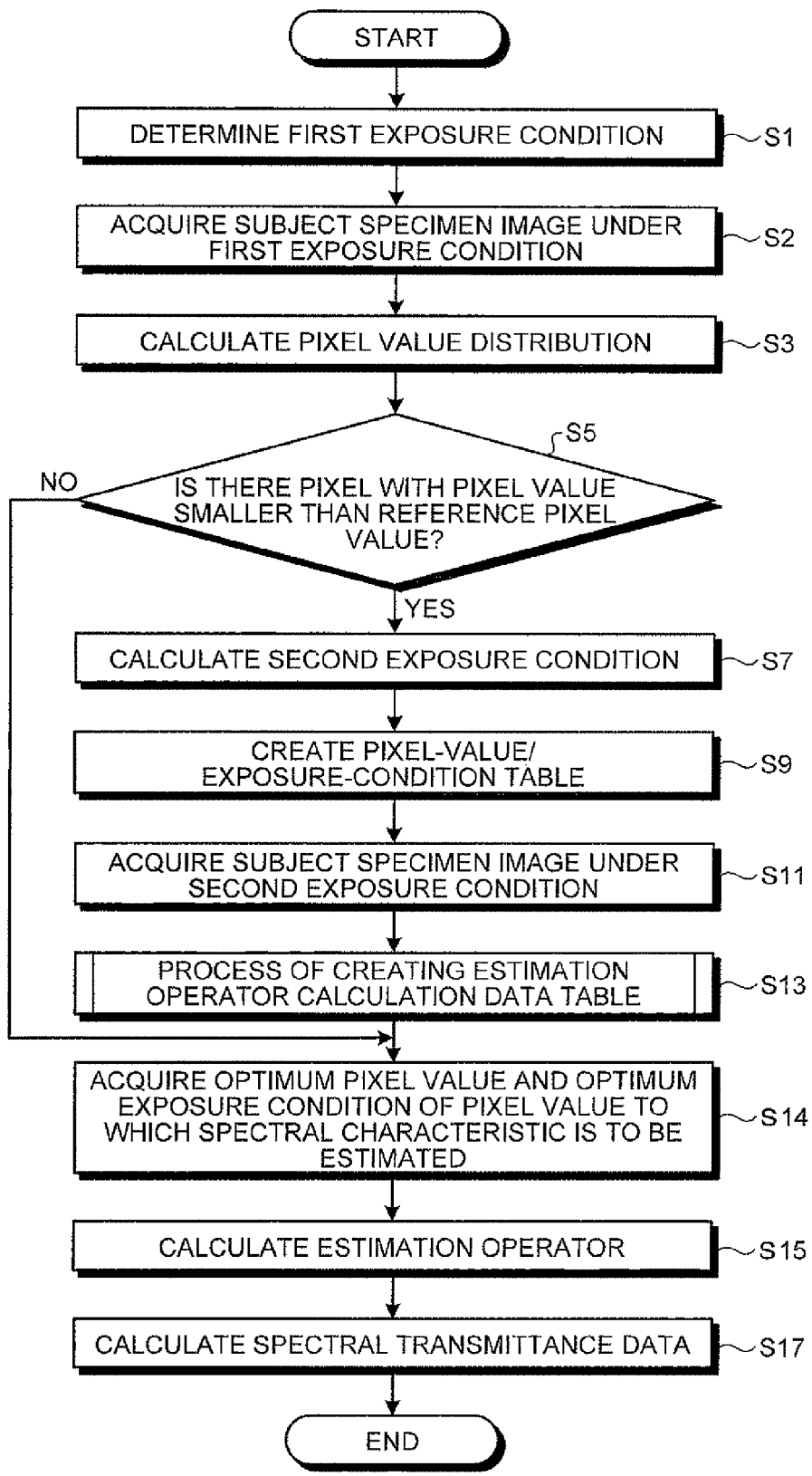
FIG. 7 is a flowchart of a process procedure performed by the image processing apparatus.

FIG. 7 is a flowchart of a process procedure performed by the image processing apparatus 1. The processing to be explained below is performed in a way that each unit of the image processing apparatus 1 operates in accordance with the image processing program 151 stored in the storage unit 150.

First, the exposure condition determining unit 163 determines a predetermined shutter speed, which is previously set, as the first exposure condition $s_1$, and notifies the multiband image acquisition controller 161 of the first exposure condition $s_1$ (step S1). With respect to the first exposure condition $s_1$, a dynamic range in an image is the maximum value.

The multiband image acquisition controller 161 controls the image acquiring operation of the image acquiring unit 110 to acquire a subject specimen image (first exposure condition image) (step S2). Under control of the multiband image acquisition controller 161, the image acquiring unit 110 acquires the first exposure condition image of the subject specimen under the first exposure condition $s_1$. The first exposure condition image is stored in the storage unit 150.

The exposure condition determining unit 163 calculates a distribution of pixel values (hereinafter, "pixel value distribution") of each band of the first exposure condition image acquired under the first exposure condition $s_1$ (step S3). The exposure condition determining unit 163 determines whether to calculate a second exposure condition $s_2$, based on the pixel value distribution. In other words, the exposure condition determining unit 163 determines whether there is a pixel value smaller than a reference pixel value $V_{th}$ in a predetermined pixel value range, based on the pixel value distribution. When the pixel values of all pixels are not smaller than the reference pixel value $V_{th}$ (NO at step S5), the process goes to step S14. In this case, the estimation operator and spectral transmittance data are calculated using the first exposure condition si and the first exposure condition image acquired under the first exposure condition $s_1$. On the other hand, when there is a pixel with a pixel value smaller than the reference pixel value $V_{th}$ (YES at step S5), the process goes to a step of calculating the second exposure condition 32 (step S7).

The pixel value distribution calculated at step S3 can be visually proposed to a user, and it can be determined whether to calculate the second exposure condition $s_2$ in accordance with an operation by a user. In this case, the control unit 160 causes the display unit 130 to display a histogram of the pixel value distribution calculated by the exposure condition determining unit 163 and display a notification of a request for determining whether to perform the image acquiring operation under the second exposure condition 32 (hereinafter, determination request) FIG. 8 is a schematic diagram a notification screen W10 notifying the determination request. The notification screen W10 shows a histogram G10 of the pixel value distribution in which the horizontal axis represents pixel values and the vertical axis represents the number of pixels, and a message M10 that requests to determine whether to calculate the second exposure condition. On the notification screen W10, buttons B11 and B13 for selecting whether to calculate the second exposure condition $s_2$ are arranged. The user selects the button B11 or B13 via the input unit 120, thereby inputting a calculation instruction or a non-calculation instruction. In accordance with a response to the notification of the determination request, the exposure condition determining unit 163 determines whether to calculate the second exposure condition $s_2$.

Thereafter, as shown in FIG. 7, at step S7, the second exposure condition calculator 165 calculates the second exposure condition $s_2$ based on the pixel value distribution calculated at step S3. Specifically, the second exposure condition calculator 165 calculates the second exposure condition $s_2$ for increasing pixel values of pixels corresponding to pixels with low pixel values in the first exposure condition image. When reference pixel values smaller than the reference pixel value $V_{th}$ are widely distributed, the second exposure condition calculator 165 calculates a plurality of stepwise second exposure conditions $s_{2,n}$ as the second exposure condition $s_2$. The larger the number of second exposure conditions $s_{2,n}$ is, the more lowing the accuracy in estimation on a pixel with a low pixel value can be prevented.

FIG. 9 is a schematic diagram for explaining calculation of the second exposure conditions $s_{2,n}$, and shows the histogram of the pixel value distribution in which the horizontal axis represents pixel values and the vertical axis represents the number of pixels. For example, as shown in FIG. 9, an optimum exposure condition of pixel values $V_{th}$ to $V_{Max}$ not smaller than the reference pixel value $V_{th}$ is set as the first exposure condition $s_1$ based on the pixel value distribution of the first exposure condition image acquired under the first exposure condition $s_1$. On the other hand, second exposure conditions $s_{2,n}$ of pixel values smaller than the reference pixel value $V_{th}$ are calculated. In other words, first, an exposure condition for increasing the reference pixel value $V_{th}$ to a maximum pixel value is calculated, and the exposure condition is set as a primary second exposure condition $s_{2,1}$. Based on a pixel value distribution of a second exposure condition image acquired under the primary second exposure condition $s_{2,1}$, an optimum exposure condition of a pixel value (for example, pixel values $V_{th2-1}$ to $V_{th}$ of the first exposure condition image) excluding the pixel value not smaller than the reference pixel value $V_{th}$ (in this case, the pixel values $V_{th}$ to $V_{Max}$), to which the optimum exposure condition is already set, is set as the primary second exposure condition $s_{2,1}$. If a second exposure condition image acquired under the primary second exposure condition $s_{2,1}$ contains a pixel value smaller than the reference pixel value $V_{th}$, the same processing is repeated to calculate a secondary second exposure condition $s_{2,2}$. In this manner, based on the pixel value of the first exposure condition image acquired under the first exposure condition $s_1$, the second exposure conditions $s_{2,n}$ for achieving pixel values of all pixels not smaller than the reference pixel value $V_{th}$ are determined. Accordingly, at least one subject specimen image with pixel values not smaller than the reference pixel value at all pixels positions can be obtained.

In the real processing, it is unnecessary to acquire a multiband image each time when a second exposure condition $s_{2,n}$ is calculated, calculate a pixel value distribution, and obtains a subsequent second exposure condition $s_{2,n}$. In other words, using the pixel value distribution of the first exposure condition image, which is calculated at step S3, the second exposure condition $s_{2,n}$ is calculated in accordance with the following Equation (6).

$$s_{2,n} = s_1 \cdot \left(\frac{V_{Max}}{V_{th}}\right)^n \quad (6)$$

where $V_{Max}$ represents a pixel value obtained by lowering the maximum value of the pixel value by a predetermined value.

When a minimum pixel value of the first exposure condition image is $V_{Min}$, a minimum value of n satisfying the following Equation (7) is the number of second exposure conditions $s_{2,n}$, where n is a positive integer.

$$V_{th} \cdot \left(\frac{V_{Max}}{V_{th}}\right)^n < V_{Min} \quad (7)$$

In this manner, the optimum exposure condition of pixels with low pixel values, specifically, pixel values smaller than the reference pixel value $V_{th}$, out of pixels constituting the first exposure condition image picked up under the first exposure condition $s_1$, based on each of the pixel values. In the above processing, by repeatedly performing the process based on the reference pixel value $V_{th}$ previously set as a threshold, second exposure conditions $s_{2,n}$ are obtained stepwise. Therefore, if the minimum pixel value $V_{Min}$ of the first exposure condition image is close to 0, the value of the number n of second exposure conditions $s_{2,n}$ is acquired as a very large value. To prevent this, a minimum reference pixel value $V_{min}$ can be previously set as a threshold. If the minimum pixel value $V_{Min}$ of the first exposure condition image satisfies $V_{Min} < V_{min}$, an upper limit of the number n of second exposure conditions $s_{2,n}$ can be set by assigning the minimum reference pixel value VMin to $V_{Min}$ in Equation (7).

When the value of the number n of second exposure conditions $s_{2,n}$ increases, while the accuracy in estimation processing for estimating a spectral characteristic improves, the time necessary for the estimation processing increases. Therefore, the number n of second exposure conditions $s_{2,n}$ can be previously set in consideration of the balance between lowering of the accuracy in the estimation processing for estimating the spectral characteristic of a pixel with a low pixel value and the time for the estimation processing. For example, the number n of second exposure conditions $s_{2,n}$ can be set in accordance with an operation by the user via the input unit 120. In this case, the reference pixel value $V_{th}$ is appropriately calculated depending on the number n. For example, when a pixel value obtained by lowering the pixel value from the maximum pixel value by a certain value is $V_{Max}$ and the minimum pixel value of the first exposure condition image is $V_{Min}$, the reference pixel value can be calculated based on the following Equation (8).

$$V_{Min} \cdot \left(\frac{V_{Max}}{V_{th}}\right)^n \le V_{th} \quad (8)$$

In this case, the minimum reference pixel value $V_{min}$ is previously can be set as a threshold. In this case, when the minimum pixel value $V_{Min}$ of the first exposure condition image satisfies a condition of $V_{Min} < V_{min}$, the minimum reference pixel value $V_{min}$ can be assigned to $V_{Min}$ in Equation (7).

For example, when the number n is 2, as shown in FIG. 9, two exposure conditions $s_{2,1}$ and $s_{2,2}$ are calculated. In addition, the second exposure condition $s_{2,1}$ is set as the optimum exposure condition of pixel values $V_{th2-1}$ to $V_{th}$ out of pixel values smaller than the reference pixel value $V_{th}$, and the second exposure condition $s_{2,2}$ is set as an optimum exposure condition of pixel values $V_{Min}$ to $V_{th2-1}$, so that the optimum exposure conditions $s_1$, $s_{2,1}$, and $s_{2,2}$ of all pixel values are set.

As shown in FIG. 7, after the second exposure condition is calculated, the exposure condition determining unit 163 creates the pixel-value/exposure-condition table 153 in which each pixel value of the first exposure condition image and a corresponding optimum exposure condition are set in association with each other, and stores the pixel-value/exposure-condition table 153 in the storage unit 150 (step S9). FIG. 10 is a table of a data structure of the pixel-value/exposure-condition table 153. As shown in FIG. 10, the first exposure condition $s_1$ is set as the optimum exposure condition of the pixel values $V_{th}$ to $V_{Max}$ not smaller than the reference pixel value $V_{th}$, and the second exposure conditions $s_{2,1}$, $s_{2,2}$, which are calculated in the above manner, are set as the optimum exposure conditions of pixel values smaller than the reference pixel value $V_{th}$. The exposure condition determining unit 163 notifies the multiband image acquisition controller 161 of the second exposure conditions calculated by the second exposure condition calculator 165.

Subsequently, as shown in FIG. 7, the multiband image acquisition controller 161 controls the image acquiring operation of the image acquiring unit 110 to acquire a subject specimen image (second exposure condition image) (step S11). Under control of the multiband image acquisition controller 161, the image acquiring unit 110 picks up an image of the subject specimen under the second exposure condition $s_{2,n}$, thereby acquiring a second exposure condition image. For example, as shown in FIG. 9, when the two second exposure conditions $s_{2,1}$ and $s_{2,2}$ are calculated, the multiband image acquisition controller 161 controls the image acquiring operation while sequentially changing the exposure condition in accordance with the second exposure conditions $s_{2,1}$ and $s_{2,2}$, thereby acquiring two second exposure condition images. The second exposure condition images are stored in the storage unit 150.

As shown in FIG. 7, the pixel value acquiring unit 141 performs estimation operator calculation data table creation processing (step S13). The pixel value acquiring unit 141 determines a pixel value (optimum pixel value) and an optimum exposure condition of each pixel position, which are used for calculating the estimation operator, from the first exposure condition image acquired at step S2 and the images of each band of the second exposure condition images (in this case, two second exposure condition images) acquired at step S11.

Figure 11:
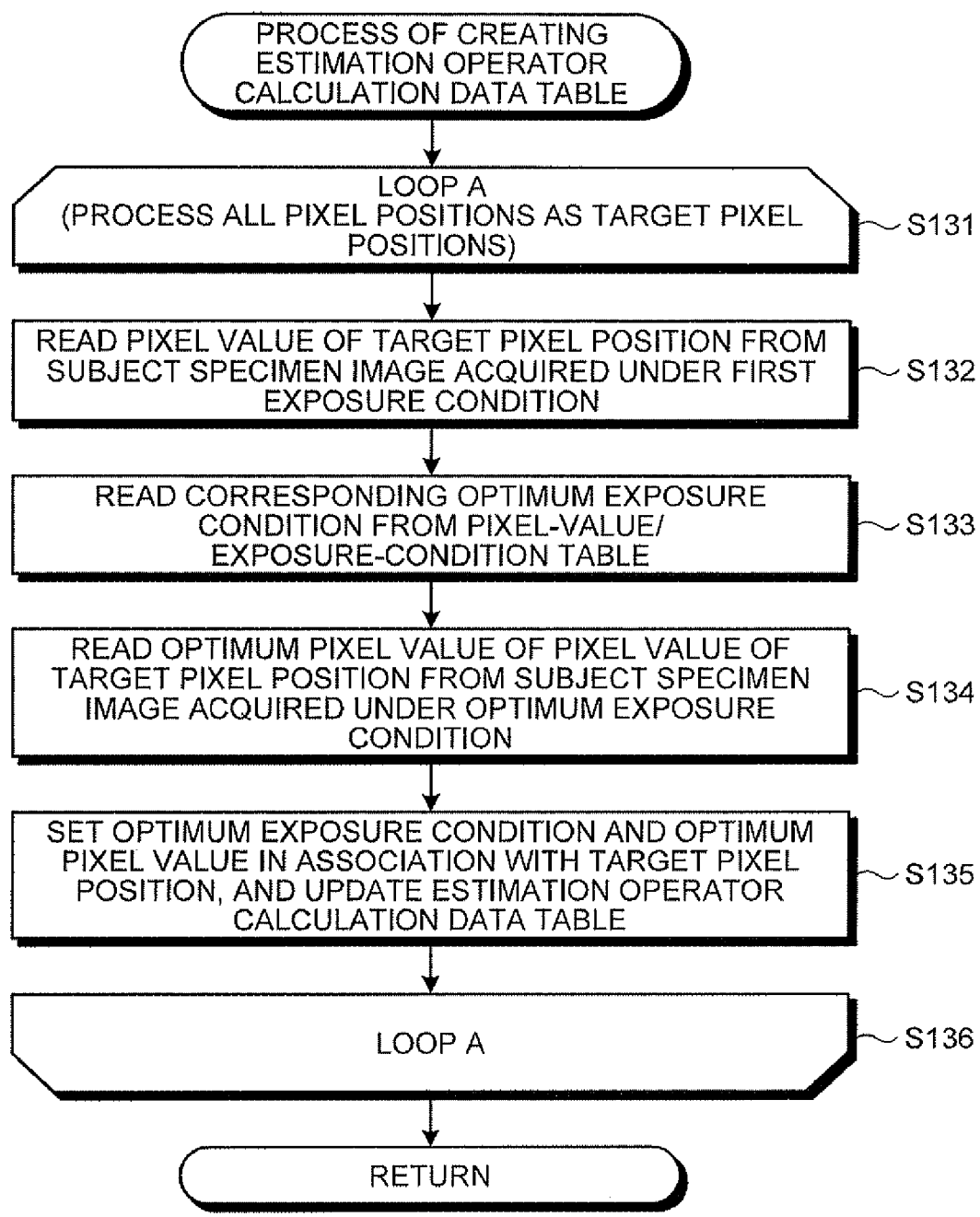
FIG. 11 is a flowchart of a detailed process procedure of estimation operator calculation data table creation processing.

FIG. 11 is a flowchart of a detailed process procedure of the estimation operator calculation data table creation processing. In the estimation operator calculation data table creation processing, the pixel value acquiring unit 141 sequentially regards all pixel positions as target pixel positions, and performs the processing of a loop A on each pixel position (steps S131 to S136).

Specifically, the pixel value acquiring unit 141 reads a pixel value of a target pixel position from the first specimen image, which is the subject specimen image acquired under the first exposure condition (step S132). Subsequently, the pixel value acquiring unit 141 reads an optimum exposure condition of the pixel value read at step S132 from the pixel-value/exposure-condition table 153 (step S133). The pixel value acquiring unit 141 reads, as the optimum pixel value, the pixel value at the target pixel positon from the first exposure condition image or the second exposure condition image acquired under the read optimum exposure condition, which is the subject specimen image acquired under the read optimum exposure condition (step S134). The pixel value acquiring unit 141 sets the optimum exposure condition read at step S133 and the optimum pixel value read at step S134 in association with the target pixel position, so that the estimation operator calculation data table 155 is updated (step S135). Following the above procedure, after determining the optimum pixel value and the optimum exposure condition of each pixel position is determined by regarding all pixel positions as target pixel positions and performing the processing of the loop A on each pixel position, the pixel value acquiring unit 141 returns to step S13 shown in FIG. 7, and goes to step S14. By creating the estimation operator calculation data table 155 as described above, only optimum pixel values and optimum exposure conditions necessary for the subsequent step of calculating the estimation operator can be stored in the storage unit 150. Therefore, the first exposure condition image and the second exposure condition images can be deleted. Because unnecessary information is deleted, the load of the storage unit 150 is reduced.

At step S14, the pixel value acquiring unit 141 refers the estimation operator calculation data table 155 created in the estimation operator calculation data table creation processing at step S13, and reads the optimum pixel value of the pixel to which a spectral characteristic is to be estimated and the optimum exposure condition in association with each other.

Subsequently, the estimation operator calculator 143 calculates an estimation operator W on the pixel to which a spectral characteristic is to be estimated, based on the optimum pixel value and the optimum exposure condition read at step S14 (step S15). Specifically, the estimation operator W is calculated in accordance with the following Equation (5) explained in the section of "BACKGROUND OF THE INVENTION".

$$W = R_{SS}H^t(HR_{SS}H^t + R_{NN}) \tag{5}$$

As explained in BACKGROUND OF THE INVENTION, the system matrix H defined by the following Equation (3) is introduced.

$$H = FSE \tag{3}$$

A spectrum transmittance F of the optical filters 1191a and 1191b, a spectral sensitivity S of the RGB camera 111, and a spectrum radiation characteristic E(^) of illumination per time unit are previously measured, using, for example, a spectrometer. In this embodiment, the spectral transmittance of the optical system 117 is close to 1.0. If the spectrum transmittance is require to be 1.0 without allowance, it suffices that the spectral transmittance of the optical system 117 is also previously measured, and the spectral transmittance is multiplied by the spectral radiation characteristic E of illumination. An autocorrelation matrix $R_{SS}$ of the spectral transmittance of the specimen and an autocorrelation matrix $R_{NN}$ of noise of the RGB camera 111 are also previously measured. $R_{SS}$ is obtained in a way that a general specimen stained through the H&E staining is prepared, the spectral transmittance at a plurality of points is measured with a spectrometer, and an autocorrelation matrix is obtained. $R_{NN}$ is obtained in a way that 6-band multiband image is prepared by the image acquiring unit 110 without a specimen, variance of pixel values of the 6-band multiband image is obtained on a band basis, and a matrix in which the variance serves as diagonal components is generated. Note that it is provided that there is no correlation of noise between bands.

Specifically, with reference to the estimation operator calculation data table 155 created in the estimation operator calculation data table generation processing shown in FIG. 11, an optimum exposure condition s on the estimation subject pixel is reflected on the spectral radiation characteristic E of illumination, which is contained in the system matrix H, in accordance with the following Equation (9).

$$E = sE_0 \tag{9}$$

where $E_0$ is the spectral radiation characteristic of illumination, which is normalized under a predetermined exposure condition.

Subsequently, as shown in FIG. 7, the spectral transmittance calculator 145 calculates spectral transmittance data at a point on the subject specimen corresponding to the estimation subject pixel of the subject specimen image, using the estimation operator calculated at step S15 (step S17). Specifically, in accordance with the following Equation (4) explained in BACKGROUND OF THE INVENTION, an estimation value $\hat{T}(x)$ of the spectral transmittance at the corresponding point on the subject specimen is estimated from the matrix expression G(x) of a pixel value of a pixel at an arbitral point x on the subject specimen image, which is the pixel to which a spectral characteristic is to be estimated. The estimated value $\hat{T}(x)$ of the spectral transmittance is stored in the storage unit 150.

$$\hat{T}(x) = WG(x) \tag{4}$$

The spectral transmittance estimated by the image processing apparatus 1 is used for, for example, estimating the amount of pigment with which the subject specimen is colored. Based on the estimated amount of pigment, the color of the image is corrected and variance of characteristics of cameras and stain condition is corrected, so that an RGB image to be displayed is synthesized. The RGB image is displayed on a screen and used for pathological diagnosis.

In the embodiment, based on pixel values of a first exposure condition image acquired under a first exposure condition, a second exposure condition for increasing pixel values of pixels with a low pixel value can be obtained. The second exposure condition can be determined under which each of pixel values of all pixels can be obtained as a pixel value not smaller than the reference pixel value Vth in any one of subject specimen images. Based on the first exposure condition image and the second exposure image, the optimum pixel value and the optimum exposure condition of each pixel position, which are used to calculate the estimation operator can be determined, and the optimum pixel value and the optimum exposure condition can be stored as the estimation operator calculation data table 155 in the storage unit 150. When a spectral characteristic of an estimation subject pixel is calculated, an optimum pixel value and an optimum exposure condition of the estimation subject pixel can be acquired with reference to the estimation operator calculation data table 155 and an estimation operator can be calculated. Using the estimation operator, data about the spectral transmittance at a point on the subject specimen corresponding to the estimation subject pixel can be calculated. Accordingly, errors in estimating the spectral characteristic due to influence of observed noise with a low pixel value can be reduced, and accuracy in estimating the spectral characteristic of the subject can be improved.

Figure 12:
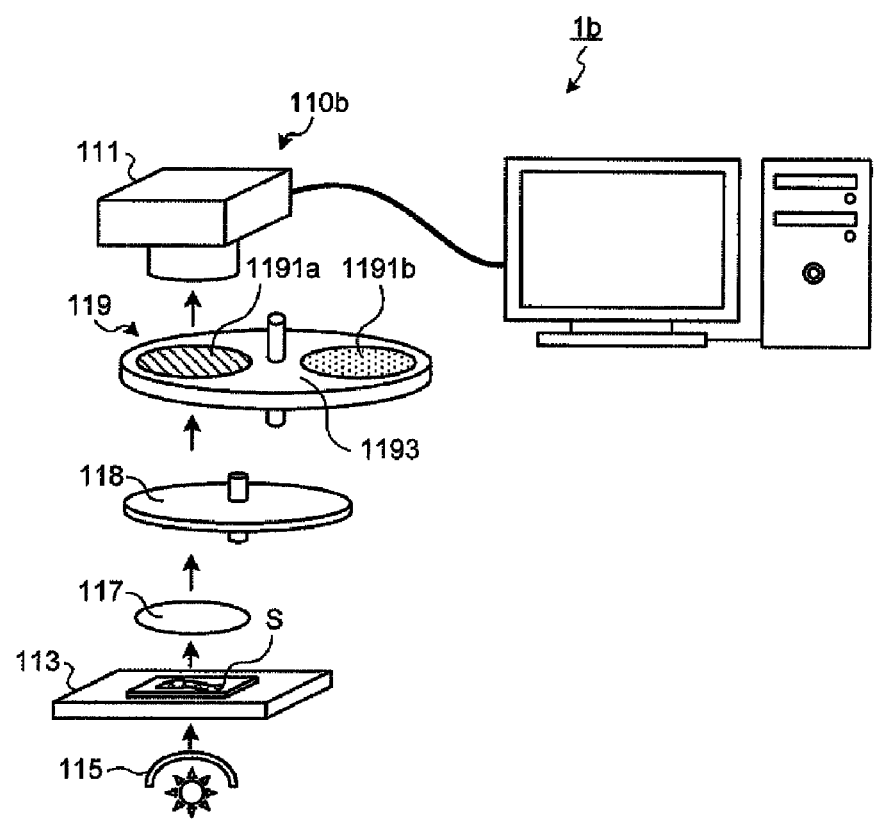
FIG. 12 is a diagram of a configuration of an image processing apparatus according to a modification of the embodiment.
Figure 13:
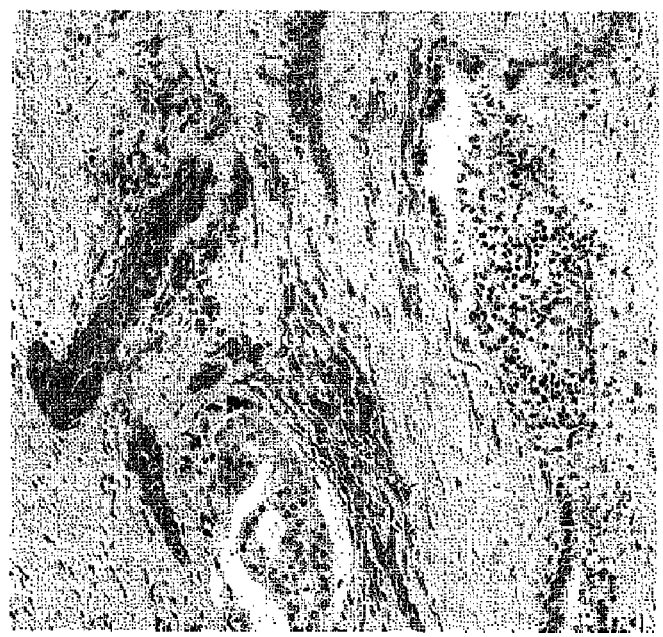
FIG. 13 is a diagram of an example of an RGB image.

In the embodiment, the case where the exposure condition is determined by adjusting the shutter speed is explained. In an alternative case, the exposure condition can be changed, employing a method other than the method of adjusting the shutter speed. For example, the exposure condition can be determined by adjusting a variable ND (neutral density) filter. FIG. 12 is a schematic diagram of a configuration of an image processing apparatus 1b of the alternative case. When the variable ND filter is used to determine the exposure condition, as shown in FIG. 12, in an image acquiring unit 110b, a variable ND filter 118 is arranged at any position on the optical path from the illuminating unit 115 to the RGB camera 111. In the example shown in FIG. 12, the image acquiring unit 110b has a configuration in which the variable ND filter 118 is arranged between the optical system 117 and the filtering unit 119. In addition, a function unit that determines an exposure condition by adjusting the variable ND filter under control of the control unit 160 of the image processing apparatus 1b is provided. Alternatively, the image acquiring unit can includes a fixed ND filter to determine the exposure condition, or the exposure condition can be determined by adjusting focus of a microscope or illumination characteristics.

In the embodiment, the second exposure condition is calculated for a pixel with a pixel value smaller than the predetermined reference pixel value out of pixel values of pixels of the first exposure condition image. Alternatively, a lower limit and an upper limit can be set as a predetermined pixel value range. In this case, when there is a pixel with a pixel value out of the predetermined pixel value range, the second exposure condition is calculated.

In the embodiment, a subsequent second exposure condition is calculated with reference to the result of an image acquired under the first exposure condition, or the subsequent second exposure condition is calculated based on the primary second exposure condition $S_{2,1}$. Alternatively, a subsequent second exposure condition can be previously determined regardless of the result of the image acquired under the first exposure condition or the result of calculating the primary second exposure condition $S_{2,1}$.

The method of determining the optimum pixel value and the optimum exposure condition, which is used by the pixel value acquiring unit 141, is not limited to the method at steps S131 to S136. For example, a pixel value of a pixel position about which processing is to be performed is acquired from each of images acquired under a plurality of conditions. The images under the exposure conditions can be obtained using any one of the above-described methods. Based on the pixel values of the images, a pixel value in a predetermined pixel value range is determined as an optimum pixel value. Specifically, a pixel value representing a value in the pixel value range defined by predetermined upper and lower limits can be determined as the optimum pixel value. Alternatively, a pixel value that is the largest value in the predetermined pixel value range can be determined as the optimum pixel value. Alternatively, a pixel value that is the closest to a predetermined pixel value can be determined as the optimum pixel value. An exposure condition on the image from which the optimum pixel value is obtained is determined as an optimum exposure condition.

In the embodiment, a spectral characteristic of a spectral transmittance is estimated from a multiband image of a pathological specimen. The embodiment can be applied to a case where a spectral characteristic of a spectral reflectance is estimated as a spectral characteristic.

In the embodiment, the pathological specimen stained through the H&E staining is observed by transmitted light observation. The embodiment can be applied to a case where a biological specimen stained using another staining method. The embodiment can be also applied to observation of reflected light, fluorescence, or emitted light.

With the image processing apparatus and a computer program product according to the embodiments of the present invention, a pixel value of any one of a plurality of subject images picked up under a plurality of exposure conditions different from each other can be acquired as a pixel value of a pixel position to which a spectral characteristic is to be estimated. An estimation operator corresponding to an exposure condition of a subject image from which the pixel value is acquired is calculated, and the spectral characteristic of the subject can be estimated. By estimating the spectral characteristic with the estimation operator corresponding to the exposure condition, errors in estimating the spectral characteristic can be reduced, thereby improving the accuracy in estimating the spectral characteristic of the subject.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus that estimates a spectral characteristic of a subject from a pixel value of a subject image of the subject using an estimation operator, the image processing apparatus comprising:

an exposure condition determining unit that determines a plurality of exposure conditions including a first exposure condition that is previously determined and a second exposure condition based on a pixel value of the subject image acquired under the first exposure condition;

an image acquiring unit that acquires image data about a plurality of subject images of the subject picked up under the plurality of exposure conditions;

a pixel value acquiring unit that acquires, as a pixel value of a pixel position to which a spectral characteristic is to be estimated, a pixel value of the image data about any one of the subject images;

an estimation operator calculator that calculates the estimation operator corresponding to the exposure condition of the subject image corresponding to the image data with the pixel value acquired by the pixel value acquiring unit; and a spectral characteristic estimating unit that estimates the spectral characteristic of the subject corresponding to the pixel position to which the spectral characteristic is to be estimated using the estimation operator calculated by the estimation operator calculator; wherein the exposure condition determining unit sets, as the first exposure condition, an exposure condition of a pixel value in a predetermined pixel value range from pixel values of the subject image acquired under the first exposure condition, and determines, as the second exposure condition, an exposure condition of a pixel value outside the predetermined pixel value range;

the pixel value acquiring unit includes a determining unit that determines an exposure condition of the pixel value at the pixel position for which the spectral characteristic is to be estimated in the subject image acquired under the first exposure condition; and the pixel value acquiring unit acquires the pixel value of the subject image acquired under the exposure condition determined by the determining unit.

2. The image processing apparatus according to claim 1, further comprising:

a determination input requesting unit that issues a request for determining whether to acquire the subject image under the second exposure condition; wherein the exposure condition determining unit determines to calculate the second exposure condition when a calculation instruction is input in response to the request from the determination input requesting unit, or not to calculate the second exposure condition when a non-calculation instruction is input.

3. The image processing apparatus according to claim 1, further comprising a storage unit that stores therein the exposure condition of the pixel value of the pixel position of the subject image acquired under the first exposure condition and the pixel value of the pixel position of the subject image acquired under the first exposure condition in association with each other, wherein the estimation operator calculator calculates the estimation operator based on the pixel value and the exposure condition stored in the storage unit in association with the pixel position to which the spectral characteristic is to be estimated.

4. The image processing apparatus according to claim 1, wherein the pixel value acquiring unit acquires a pixel value in a predetermined pixel value range from pixel values of the subject images acquired by the image acquiring unit.

5. The image processing apparatus according to claim 1, wherein the estimation operator calculator calculates the estimation operator based on a spectral radiation characteristic corresponding to the exposure condition of the subject image from which the pixel value acquiring unit acquires the pixel value.

6. The image processing apparatus according to claim 1, wherein the spectral characteristic is a spectral transmittance or a spectral characteristic of spectral transmittance or spectral reflectance.

7. A computer program product having a computer readable medium including programmed instructions for estimating a spectral characteristic of a subject using an estimation operator from a pixel value of a subject image of the subject, wherein the instructions, when executed by a computer, cause the computer to perform:

determining a plurality of exposure conditions including a first exposure condition that is previously determined and a second exposure condition based on a pixel value of the subject image acquired under the first exposure condition;

acquiring image data about a plurality of subject images of the subject picked up under the plurality of exposure conditions;

acquiring, as a pixel value of a pixel position to which a spectral characteristic is to be estimated, a pixel value of the image data about any one of the subject images;

calculating the estimation operator corresponding to the exposure condition of the subject image corresponding to the image data with the pixel value acquired by the pixel value acquiring unit; and estimating the spectral characteristic of the subject corresponding to the pixel position to which the spectral characteristic is to be estimated using the estimation operator calculated by the estimation operator calculator; wherein the determining includes setting, as the first exposure condition, an exposure condition of a pixel value in a predetermined pixel value range from pixel values of the subject image acquired under the first exposure condition, and determining, as the second exposure condition, an exposure condition of a pixel value outside the predetermined pixel value range; and the acquiring the pixel value includes determining an exposure condition of the pixel value at the pixel position for which the spectral characteristic is to be estimated in the subject image acquired under the first exposure condition, and acquiring the pixel value of the subject image acquired under the exposure condition determined.

8. An image processing method of estimating a spectral characteristic of a subject from a pixel value of a subject image of the subject using an estimation operator, the image processing method comprising:

determining a plurality of exposure conditions including a first exposure condition that is previously determined and a second exposure condition based on a pixel value of the subject image acquired under the first exposure condition;

acquiring image data about a plurality of subject images of the subject picked up under the plurality of exposure conditions;

acquiring, as a pixel value of a pixel position to which a spectral characteristic is to be estimated a pixel value of the image data about any one of the subject images;

calculating the estimation operator corresponding to the exposure condition of the subject image corresponding to the image data with the pixel value acquired by the pixel value acquiring unit; and estimating the spectral characteristic of the subject corresponding to the pixel position to which the spectral characteristic is to be estimated using the estimation operator calculated by the estimation operator calculator; wherein the determining includes setting, as the first exposure condition, an exposure condition of a pixel value in a predetermined pixel value range from pixel values of the subject image acquired under the first exposure condition, and determining as the second exposure condition, an exposure condition of a pixel value outside the predetermined pixel value range; and the acquiring the pixel value includes determining an exposure condition of the pixel value at the pixel position for which the spectral characteristic is to be estimated in the subject image acquired under the first exposure condition, and acquiring the pixel value of the subject image acquired under the exposure condition determined.

* * * * *